United States Patent [19]

Mackey

[11] Patent Number: 5,038,654
[45] Date of Patent: Aug. 13, 1991

[54] APPARATUS FOR SCORING A GLASS SHEET

[75] Inventor: Donald A. Mackey, Pittsburgh, Pa.

[73] Assignee: PPG Industries, Inc., Pittsburgh, Pa.

[21] Appl. No.: 333,143

[22] Filed: Apr. 4, 1989

[51] Int. Cl.⁵ ............................................. B26D 3/08
[52] U.S. Cl. ........................................ 83/880; 83/881; 83/76; 83/361
[58] Field of Search ................ 83/861, 879, 880, 881, 83/886, 76, 361, 362, 363

[56] References Cited

U.S. PATENT DOCUMENTS

| | | | |
|---|---|---|---|
| 3,280,676 | 10/1966 | Grzymislanwski | 83/881 |
| 3,399,586 | 9/1968 | Insolio et al. | 83/881 |
| 3,742,793 | 7/1973 | Gray et al. | |
| 3,756,104 | 9/1973 | Bier et al. | |
| 3,760,997 | 9/1973 | Bier. | |
| 3,880,028 | 4/1975 | Frederick, Jr. | |
| 4,137,803 | 2/1979 | Goldinger. | |
| 4,171,657 | 10/1979 | Halberschmidt et al. | |
| 4,204,445 | 5/1980 | Goldinger. | |
| 4,226,153 | 10/1980 | Insolio | 83/881 |
| 4,517,872 | 5/1985 | Dontscheff | 83/880 |
| 4,624,169 | 11/1986 | Nelson | 83/881 |

Primary Examiner—Frank T. Yost
Assistant Examiner—Scott A. Smith
Attorney, Agent, or Firm—Andrew C. Siminerio

[57] ABSTRACT

The load applied to a scoring wheel to the combined load of a first predetermined constant load and a second variable load. The second load is varied in response to changes in the scoring speed to provide a uniform scoring depth.

19 Claims, 1 Drawing Sheet

APPARATUS FOR SCORING A GLASS SHEET

BACKGROUND OF THE INVENTION

1. Field of the Invention

This invention relates to cutting glass sheets and in particular to a cutting head assembly that responds quickly to changes in the load applied to a cutting wheel of a cutting assembly to control the quality of the cut glass edge.

2. 2A Technical Considerations

The quality of a cut glass edge obtained in a cutting operation using conventional scoring and breaking techniques depends in part upon the quality of the scored line. It is preferred to have a constant scoring depth which provides a uniform edge quality after removing trim from the glass sheet. When scoring a curvilinear line, and in particular when scoring sharp corners of a glass sheet, for example an automotive window, the speed at which the scoring wheel travels along the glass sheet is reduced so that the wheel can better follow the desired contour to be scored. As scoring speed decreases, the load applied to the cutting wheel must be increased to maintain the desired scoring depth. The pressure on the cutting wheel can be provided by a pneumatic cylinder and controlled by varying the load from the cylinder. However, these types of cylinders have a slow response time and cannot increase and decrease the load applied to the cutting wheel at a fast enough rate to optimize cutting speed. As a result, when scoring the glass at optimal speed, portions of the scored perimeter will not be scored at the optimal load required to provide constant scoring depth.

It would be advantageous if variations in the loading required to maintain the proper scoring depth could be controlled to precisely provide the necessary loading required for a given scoring speed and further to be able to quickly change the load in response to changes in scoring speed so as to maintain optimal scoring depth and consistent edge quality while providing maximum scoring speed.

2B. Patents of Interest

U.S. Pat. No. 3,742,793 to Gray et al. teaches a cutter assembly and a double acting pneumatic cylinder and piston. The cutter assembly is connected to the piston which is operable to urge the cutter assembly towards the surface to be scored.

U.S. Pat. Nos. 3,756,104 to Bier et al. and 3,760,997 to Bier teach the cutting of glass using a cutter head connected to a constant reluctance motor. Pressure exerted by the cutter head responds to changes in the current supplied to the motor making it possible to vary the depth of the score as desired during the making of the pattern cut.

U.S. Pat. No. 3,880,028 to Frederick Jr. teaches a method and apparatus for monitoring and controlling glass cutting. Sound waves produced by scoring the glass in a cutting operation are detected and correlated to the quality of the cut. Scoring speed and pressure on the scoring tool are controlled in response to the detected sound level.

U.S. Pat. Nos. 4,137,803 and 4,204,445 to Goldinger teach a scoring device that will maintain a constant cutting force on a glass sheet despite irregularities in glass thickness or oscillation of the scoring head carriage assembly.

U.S. Pat. No. 4,171,657 to Halberschmidt et al. teaches a numerically controlled cutting machine. The cutting head is connected to a pressure control tube which in turn is connected to a hydraulic control device which changes the cutting pressure during the scoring operation.

SUMMARY OF THE INVENTION

The present invention provides a cutting assembly which provides quick response for changes in cutting pressure required to optimize the quality of a cut edge. Load is applied to the cutting wheel of the cutting assembly by a primary, constant loading assembly and a secondary, variable loading assembly. In one particular embodiment of the invention, the primary loading assembly is a cylinder which provides a constant load on the cutting head. The secondary loading assembly includes a spring member which, when compressed, transfers the load on the spring directly to the cutting head such that the total force on the cutting head is equal to the primary load plus the secondary load.

DETAILED DESCRIPTION OF THE INVENTION

The present invention teaches the scoring of a glass sheet but it should be appreciated that the present invention may be used in any type of cutting operation where quick response to changes in the cutting loads are required.

Figure 1:
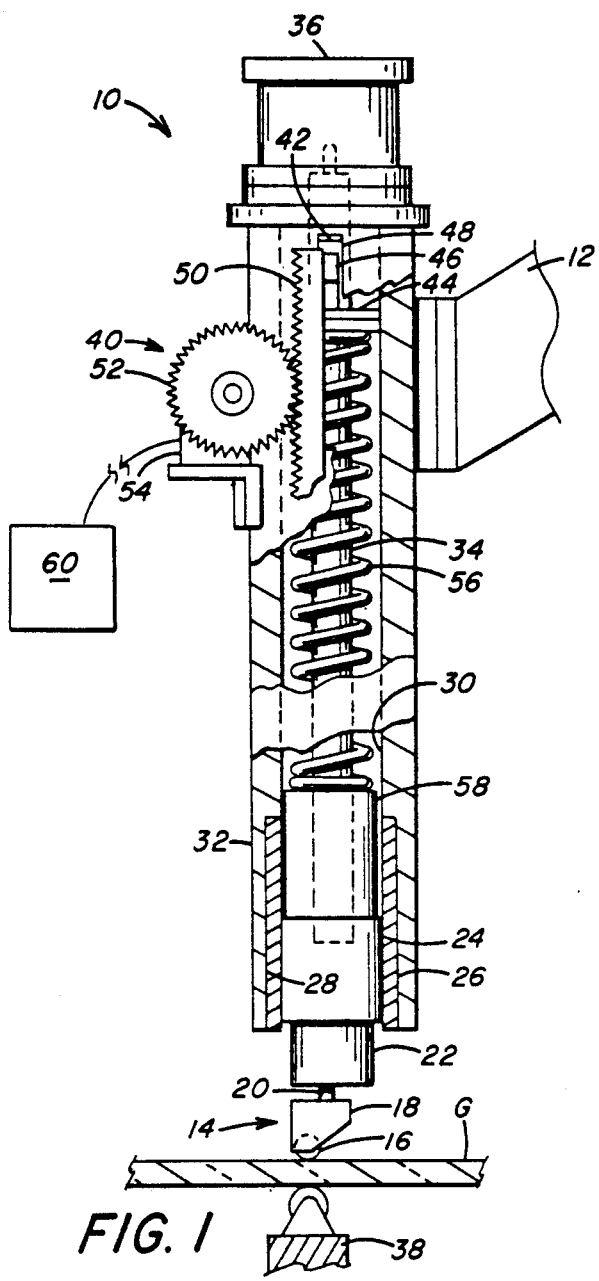
FIG. 1 is a side elevation, partly in section and partly cut-away of a cutting assembly, incorporating the present invention.
Figure 2:
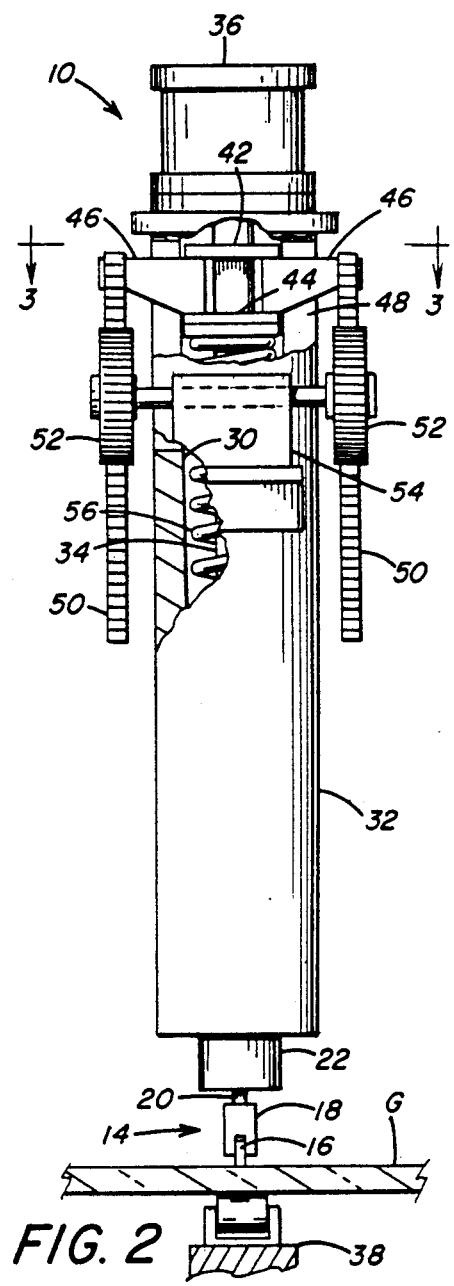
FIG. 2 is a front elevation partly in section and partly cut-away of the cutting assembly shown in FIG. 1.

Referring to FIGS. 1 and 2, scoring apparatus 10 is secured to a cutting assembly frame 12 (shown only in FIG. 1). Apparatus 10 includes a cutting assembly 14 having a scoring wheel 16, a carrier 18, post 20 and wheel support and bearing assembly 22 which is mounted on slide 24. Slide 24 is slidably positioned within bearings 26 at the downwardly open end 28 (as viewed by FIG. 1) of cavity 30 in jacket 32. Shaft 34 extends from slide 24 through cavity 30 to a primary loading device 36. Although not limiting in the present invention, in the particular embodiment illustrated in FIGS. 1 and 2, device 36 is a hydraulic cylinder secured to the upper end of jacket 32. When cylinder 36 is pressurized, it provides a constant, downwardly directed pressure through shaft 34 to scoring wheel 16 for scoring glass sheet G. As an alternative, other loading devices, such as a spring (not shown) may be used to provide the primary loading. Support 38 is positioned below the glass sheet G, opposite the scoring wheel 16 to support the sheet during scoring.

Figure 3:
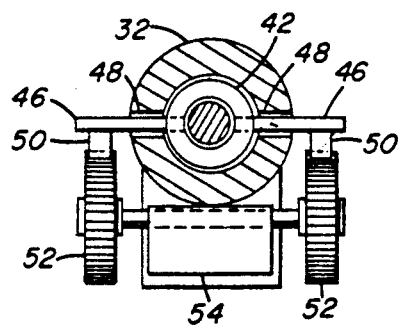
FIG. 3 is a view through line 3—3 of FIG. 2.

Apparatus 10 is provided with a secondary loading assembly 40 to rapidly change the load on the scoring wheel 16 in response to changes in the scoring speed so as to maintain the proper scoring depth required to control the cut edge glass quality. Although not limiting in the present invention, in the particular embodiment illustrated in FIGS. 1, 2, and 3, assembly 40 includes collars 42 and 44 slidably positioned about shaft 34 such that the collars 42 and 44 can freely slide along shaft 34 within cavity 30 of jacket 32. Tabs 46 project from between collars 42 and 44 through slots 48 in jacket 32. Gear racks 50 are secured to each tab 46 and are engaged by pinions 52 which are driven by a common drive 54 mounted to jacket 32. Gear racks 50 are oriented such that rotation of pinions 52 moves collars 42 and 44 in a vertical direction along shaft 34 within cavity 30 of jacket 32. Spring 56 is positioned within cavity 30 and captured on shaft 34 between lower collar 44 and the upper end of slide 24, preferably in an uncompressed state, as will be discussed later. If required, a spacer 58 (shown only in FIG. 1) is used to secure spring 56 in position if spring 56 does not extend the entire distance between slide 24 and collar 44.

The cutting operation is controlled by a controller 60 which includes the coordinates of the periphery of the glass part to be scored as well as processing routines that process the coordinate data to determine the optimal scoring speeds and associated cutting wheel loading for a particular glass part. In operation, cylinder 36 provides the minimal loading for scoring the glass sheet G when the cutting assembly 12 is moving at its maximum speed. When the scoring speed is reduced, for example to better track the pattern to be scored about a radius, the load must be increased to provide the scoring action required to maintain the desired scoring depth. The controller 60 directs drive 54 to move collars 42 and 44 downward a predetermined distance to compress spring 56. The compression of the spring 56 generates an additional loading that is transferred directly to the cutting assembly 14 as can be seen in FIGS. 1 and 2. The magnitude of the additional loading is determined by the compression of the spring 56. The amount of downward movement of collars 42 and 44 corresponding compression of spring 56 required to provide the additional loading is based on the following equation:

$$F = K \times (\Delta L)$$

wherein:
F = the additional load
K = spring constant
$\Delta L$ = change in spring length Since the spring 56 is initially positioned within jacket 32 at its uncompressed length, the downward movement of collars 42 and 44 by drive 54 will be equal to $\Delta L$. The load resulting from the compression of spring 56 will be in addition to the primary load provided to the scoring wheel 16 from cylinder 36.

Because there is no requirement that the spring 56 be compressed in predetermined increments, the spring 56 can be compressed any amount and therefore the additional loading to the scoring wheel 16 is infinitely variable, limited only by the length to which spring 56 can be compressed. As a result, the precise additional loading required to maintain the desired scoring depth may be provided.

As an alternative, the loads from the cylinder 36 and compressed spring 56 can be combined to constantly provide the maximum required scoring load with the compression of spring 56 being reduced in response to changes in the scoring speed to reduce the effective scoring load applied to scoring wheel 16.

Figure 4:
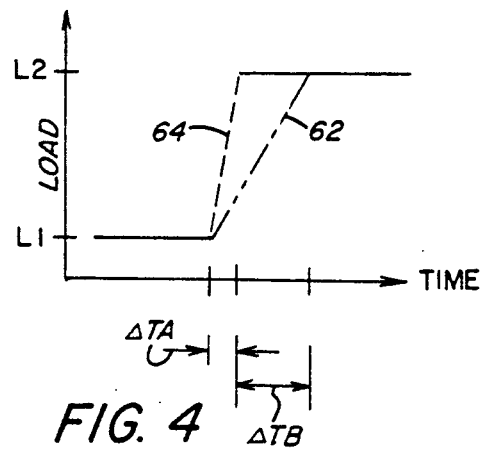
FIG. 4 is a graph comparing the response time of a pneumatic loading system and an assembly incorporating the present invention.

The present invention provides a fast loading response to the cutting apparatus 10 in response to directions from the controller 60, i.e. the lag time between the signal from the controller 60 to change cutting pressure and the time at which the desired pressure is achieved is minimal. FIG. 4 illustrates the response time required to change the loading on the scoring wheel 16 from a load L1 to L2. Dotted line 62 schematically illustrates the approximate response time for a pneumatic cylinder to pressurize and provide the necessary change in loading and dotted line 64 illustrates the approximate response time for a cutting assembly incorporated in the present invention. In particular, it can be seen that the response time for the present invention of $\Delta T_A$ is shorter than the response time for the pneumatic loading assembly which is $\Delta T_B$. The delays in the pneumatic system are due in part to the requirement that the system must be pressurized or depressurized with a compressible fluid, for example, air, in order to change the load. In the present invention, the change in loading is directly controlled by compression of the spring 56 and any delays which are due to the activation of drive 54 or gear mismatch between gear rack 50 and pinion 52 are minimal.

Based on the teachings of the present invention, it would be obvious to one skilled in the art that the rack and pinion drive arrangement used to move the collars 42 and 44 and compress spring 56 may be replaced with any other type linear actuators, such as, but not limited to, a ball screw or cable and pulley arrangement.

Although in the preferred embodiment of the invention, cylinder 36 provides a constant minimal pressure and assembly 40 provides a positive additional pressure in the same direction as the load from cylinder 36, based on the teachings of this disclosure it is obvious that the apparatus 10 can be assembled and controlled so that cylinder 36 provides a constant maximum pressure (corresponding to the slowest scoring speed) and assembly 40 provides a negative load, i.e. a load that opposes the load from cylinder 36 such that the total load on cutting wheel 16 is the load from cylinder 36 less the load from spring 56. With this configuration, the controller 60 would allow spring 56 to remain in its uncompressed state when the relative movement of the scoring wheel 16 is slow and would compress spring 56 to reduce the load from the primary loading cylinder 36 as the scoring speed increases.

The present invention provides a scoring apparatus that responds quickly to required changes in loading so as to control the cut glass edge quality. As discussed earlier the controller 60 may be used to determine the necessary changes in cutting pressure during a scoring routine to correspond directly with changes in scoring speed as the glass part periphery is scored. Alternatively, a programmer can direct the controller to change the cutting load at predetermined locations about the part periphery.

The form of the invention shown and described in the specification represents a preferred embodiment thereof. It is understood that various changes may be made without departing from the spirit of the invention as defined in the claimed subject matter which follows.

I claim:
1. An apparatus for scoring the surface of a sheet of material comprising:
   scoring means;
   first means to apply a first predetermined load on said scoring means; and
   second means to apply a second predetermined load on said scoring means wherein the total load on said scoring means is the combined load of said first and second load applying means including means to automatically control said second loading means in response to changes in scoring speed.

2. The apparatus as in claim 1 wherein said total load is less than said first predetermined load.

3. The apparatus as in claim 1 wherein said total load is greater than said first predetermined load.

4. The apparatus as in claim 1 wherein said first load applying means includes means to maintain said first predetermined load and said second load applying means include means to vary said second predetermined load.

5. The apparatus as in claim 4 wherein said first load applying means is a fluid cylinder.

6. The apparatus as in claim 4 further including a housing with a rod extending therethrough and means to mount said scoring means at a first end of said rod and further wherein said first load applying means is operably engaged at an opposing end of said rod to apply said first predetermined load on said scoring means through said rod.

7. The apparatus as in claim 6 wherein said second load applying means includes a spring captured between said scoring means and a slidable collar within said housing and means to move said collar relative to said rod and within said housing to compress said spring wherein movement of said collar towards and away from said scoring means changes the length of said spring and said second predetermined load applied to said scoring means.

8. The apparatus as in claim 7 wherein said moving means includes tabs extending from said collar and drive means operatively connected to said tabs to move said collar within said housing along said rod to change the length of said spring.

9. The apparatus as in claim 8 further including means to move said scoring means and said sheet relative to each other to establish a scoring speed and means to control said drive means to change the length of said spring and corresponding second predetermined load exerted by said spring on said scoring means in response to changes in said scoring speed.

10. The apparatus as in claim 1 further including means capable of moving said sheet and said scoring means relative to each other when said scoring means is in a scoring position to establish said scoring speed.

11. The apparatus as in claim 10 wherein said automatic control means includes means to increase the load applied by said second load applying means to said scoring means when said scoring speed is reduced and means to decrease the load applied by said second load applying means to said scoring means when said scoring speed is increased.

12. A method of scoring a sheet of material comprising:
contacting a surface of a sheet to be scored with a scoring tool;
applying a first predetermined load to said scoring tool;
applying a second predetermined load to said scoring tool wherein the total load on said scoring tool is the combined load of said first and second loads; and
moving said sheet and scoring tool relative to each other to score said sheet, wherein said moving step includes the step of varying the speed at which said sheet and tool move relative to each other and further including the step of varying said second predetermined load in response to said varying speed to obtain a generally uniform scoring depth.

13. The method as in claim 12 further including the step of applying said second predetermined load such that said total load is less than said first predetermined load.

14. The method as in claim 12 further including the step of applying said second predetermined load such that said total load is greater than said first predetermined load.

15. The method as in claim 14 wherein said second load applying step includes operatively engaging said tool with a spring and compressing said spring wherein said second load is applied on said tool from said spring.

16. The method as in claim 15 wherein said varying step includes controlling the compression of said spring in response to changes in said scoring speed to maintain said scoring depth.

17. The method as in claim 12 wherein said step of varying said second load includes the steps of increasing said second load applied to said scoring tool when said scoring speed is reduced and decreasing said second load applied to said scoring tool when said scoring speed is increased.

18. An apparatus for scoring the surface of a sheet of material comprising:
a scoring means;
means to apply a fixed predetermined load on said scoring means;
means to apply a variable load on said scoring means wherein the total load on said scoring means is the combined load of said fix load applying means and said variable load applying means;
means to move said sheet and scoring means relative to each other at varying predetermined speeds to establish scoring speeds; and
means to vary said variable load applying means in response to said scoring speeds so as to vary the total load and provide a desired scoring depth.

19. A method of scoring a sheet of material comprising:
contacting a surface of a sheet to be scored with a scoring tool;
applying a fixed predetermined load to said scoring tool;
applying a variable load to said scoring tool wherein the total load on said scoring tool is the combined load of said fixed and variable loads;
moving said sheet and said scoring tool relative to each other at varying predetermined speeds to provide scoring speeds; and
varying said variable load in response to said scoring speeds so as to vary the total load and provide a desired scoring depth during said moving step.

* * * * *